(12) United States Patent
Kawakubo et al.

(10) Patent No.: US 7,155,996 B2
(45) Date of Patent: Jan. 2, 2007

(54) LUBRICATION SYSTEM FOR A TRANSMISSION GEAR MECHANISM

(75) Inventors: Hiroyuki Kawakubo, Wako (JP); Toru Gunji, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 21 days.

(21) Appl. No.: 10/818,845

(22) Filed: Apr. 5, 2004

(65) Prior Publication Data

US 2004/0216554 A1    Nov. 4, 2004

(30) Foreign Application Priority Data

Apr. 7, 2003  (JP)  ............................. 2003-102755

(51) Int. Cl.
F16H 57/02 (2006.01)
F16H 57/04 (2006.01)
F01M 1/02 (2006.01)
F03B 75/32 (2006.01)

(52) U.S. Cl. .................. 74/606 R; 74/467; 123/196 R; 123/197.1

(58) Field of Classification Search .................. 74/329, 74/606 R, 331, 467, 468; 184/6.12; 123/196 R, 123/197.1, 197.5
See application file for complete search history.

(56) References Cited

U.S. PATENT DOCUMENTS

| 5,309,878 A | * | 5/1994 | Kandler et al. | ........ 123/196 M |
| 5,588,405 A | * | 12/1996 | Sawa et al. | ............. 123/196 R |
| 6,364,797 B1 | * | 4/2002 | Ikusue et al. | ............. 74/606 R |
| 6,739,291 B1 | * | 5/2004 | Kawakubo et al. | ..... 123/196 R |
| 6,799,485 B1 | * | 10/2004 | Kawamoto et al. | ........... 74/335 |
| 6,827,106 B1 | * | 12/2004 | Hori et al. | ................ 74/606 R |
| 6,860,366 B1 | * | 3/2005 | Hori et al. | ..................... 184/52 |
| 2004/0237680 A1 | * | 12/2004 | Burkle et al. | ................. 74/329 |

FOREIGN PATENT DOCUMENTS

JP    2655407    5/1997

* cited by examiner

Primary Examiner—Roger Pang
(74) Attorney, Agent, or Firm—Hamre, Schumann, Mueller & Larson, PC

(57) ABSTRACT

By blocking off a partial passage opening in a lubricating oil supply passage of a transmission gear mechanism by attaching a transmission holder, an operation to block off the passage opening is omitted. Supply of lubricating oil to a main shaft and a counter shaft of a transmission gear mechanism is carried out using branched passages from a main gallery, and the branched passage constitutes a lubricating oil supply passage to the main shaft while the branched passage constitutes a lubricating oil supply passage to the counter shaft. A partial passage opening of the branched passage is then blocked up at the time of attaching a transmission holder to the transmission case, and in this way a lubricating oil supply passage to the counter shaft is formed.

5 Claims, 8 Drawing Sheets

LUBRICATION SYSTEM FOR A TRANSMISSION GEAR MECHANISM

FIELD OF THE INVENTION

The present invention relates to a lubrication system for a transmission gear mechanism, and particularly to an improved structure for a passageway for supplying lubricating oil for a cartridge type transmission gear system.

BACKGROUND OF THE INVENTION

In the supply of lubricating oil for a transmission gear mechanism, lubricating oil supplied from an oil pump passes through a suitable fixed oil passageway, is guided to an oil passage formed inside a transmission case wall section and a thick part of a transmission case cover (transmission holder), passes through an oil supply passage passing through inner parts of a main shaft and a counter shaft (drive shaft), and is then sequentially supplied to bearing sections of the shafts and reduction gear train mounting sections.

As shown in FIG. 8 and FIG. 9, a transmission gear mechanism disclosed in Japanese patent No. 2655407 has a structure where a primary drive gear 01a provided on one end of an engine crankshaft 01 meshes with a primary driven gear 02c on a counter shaft (main shaft) 02, with rotation of the crankshaft 01 being transmitted to the counter shaft 02 via a switching clutch 02d interposed between the primary driven gear 02c and the counter shaft 02, and also transmitted to a drive shaft (counter shaft) 03 by means of meshing of reduction gear trains 02e and 03e. Reference numeral 03s is a drive sprocket.

The lubrication system for a transmission gear mechanism is configured such that lubricating oil force-fed from a lubricating oil pump 010 passes through a fixed oil passage 04 (refer to FIG. 9), through an oil passage such as inside a wall section of a transmission case OM1 and inside a thick part of a transmission case cover 0M3, through oil passages 02h and 03h passing through centers of the counter shaft 02 and the drive shaft 03, and is finally supplied to bearing sections 02f and 03f and mounting sections 02g, 03g of reduction gear trains 02e and 03e, to carry out lubrication of the bearing sections 02f and 03f, and the mounting sections 02g and 03g of the reduction gear trains 02e and 03e.

The passage for supply of lubricating oil to the main shaft (counter shaft) 02 and counter shaft (drive shaft) 03 of the lubrication system of the transmission gear mechanism is made usually up of passages and slots formed inside wall sections of the transmission case 0M1 and inside a thick part of a transmission holder (transmission case cover) 0M3, and supply of lubricating oil to the main shaft 02 and counter shaft 03 is achieved by means of a fixed branched passage section from an engine main gallery.

The lubricating oil passages formed so as to pass through the inside of a wall section of the transmission case 0M1 and inside thick section of the transmission holder 0M3 are often formed as opened passage openings in end wall sections of the transmission case 0M1 and transmission holder 0M3, and passages for supply of lubricating oil are formed by blocking off the passage openings in an open state using suitable means, and lubricating oil is often supplied to the main shaft 02 or the counter shaft 03 through this type of branched passage section.

Blocking of the passage openings that are left open in the end wall sections of the transmission case 0M1 and the transmission holder 0M3 is usually achieved using plug members, specifically, by inserting plug members into passage openings that are opened and filling them, the openings are blocked up in a completely sealed state.

However, with this type of blocking of the passage openings that are in an opened state by inserting and filling plug members is troublesome operation, and it is necessary to prepare separate components such as the plug members for the blocking, which increases costs.

The lubricating oil supply passages of the lubrication system for the transmission gear mechanism have such an arrangement and structure, and passage openings of the end wall section of the transmission case 0M1 and transmission holder 0M3 that are to be blocked become the rear side of the plug members, that is, when looking from the side, transmission gear mechanism and the end wall section passage opening that are to be blocked, of the oil supply passage, are positioned completely overlapping the clutch members, which means that after clutch assembly it is difficult to confirm a blocked state of the passage opening of the end wall section using plug members or the like, and assembly errors of the plug members.

There has therefore been a demand for a good scheme for blocking of passage openings of end wall sections of the transmission case 0M1 and transmission holder 0M3 of a lubricating oil supply passage of a transmission gear mechanism that does not require a troublesome operation and is simple, and which can be ensured at low cost.

SUMMARY OF THE INVENTION

The present invention relates to an improved structure for a lubricating oil supply passage for solving the above described problems. Blocking of passage openings of a transmission case and end wall sections of a transmission holder of the oil supply passage way is the improved structure achieved through simple structural modification of the transmission case and transmission holder in a lubrication system for a transmission gear mechanism for carrying out lubrication by supplying oil to a main shaft and a counter shaft of a transmission gear mechanism, comprising an oil supply passageway for supplying oil for lubrication from a main gallery of an engine to the main shaft and the counter shaft, and the oil supply passage has passage sections formed by blocking off part of the oil supply passage with a transmission holder of the transmission gear mechanism that exists at a clutch side.

A lubrication system for a transmission gear mechanism for supplying oil to a main shaft and a counter shaft of a transmission gear mechanism to cause lubrication, provided with an oil supply passage for supplying oil for lubrication from a main gallery of an engine to the main shaft and the counter shaft, and having a passage section formed by blocking off part of the oil supply passage with a transmission holder of the transmission gear mechanism that exists at a clutch side. Since blocking to form the passage section of the oil supply passage is achieved using the transmission holder, and an operation of assembling plug members which was required in the blocking for forming the passage section of the oil supply passage is no longer required, working efficiency with respect to transmission gear mechanism assembly is improved, and there is no danger of plug member assembly errors.

Also, since there is no need for separate components such as the plug members, the cost can be reduced to the extent of those parts, and there is provided a cartridge type transmission gear system comprising a lubricating oil supply passage simply and reliably accomplishing supply of lubricating oil to a main shaft and a counter shaft.

Further, the lubrication system for the transmission gear mechanism may comprise a cartridge type transmission integrally unitized with the transmission holder. It is possible to easily remove the transmission gear mechanism at the same time as removing the transmission holder, but without dismantling a crank case, and since a lubricating oil supply passage is formed using the transmission holder at the same time as assembling the transmission gear mechanism, troublesome operations such as blocking the passage opening are omitted, and the work efficiency is improved and cost is reduced.

It is also possible to do away with the time required for gear replacement, particularly with a racing vehicle, which is one of the primary effects of using a cartridge type transmission.

Also, the lubrication system for a transmission gear mechanism may comprise a clutch attached on the cartridge type transmission. When assembling or removing the transmission gear mechanism there is no need for a separate operation to assemble or remove the clutch, and so it is possible to improve the working efficiency of assembling or removing the transmission gear mechanism.

DETAILED DESCRIPTION OF THE INVENTION

Embodiments of the present invention will be described in the following based on FIG. 1 to FIG. 7.

Figure 1:
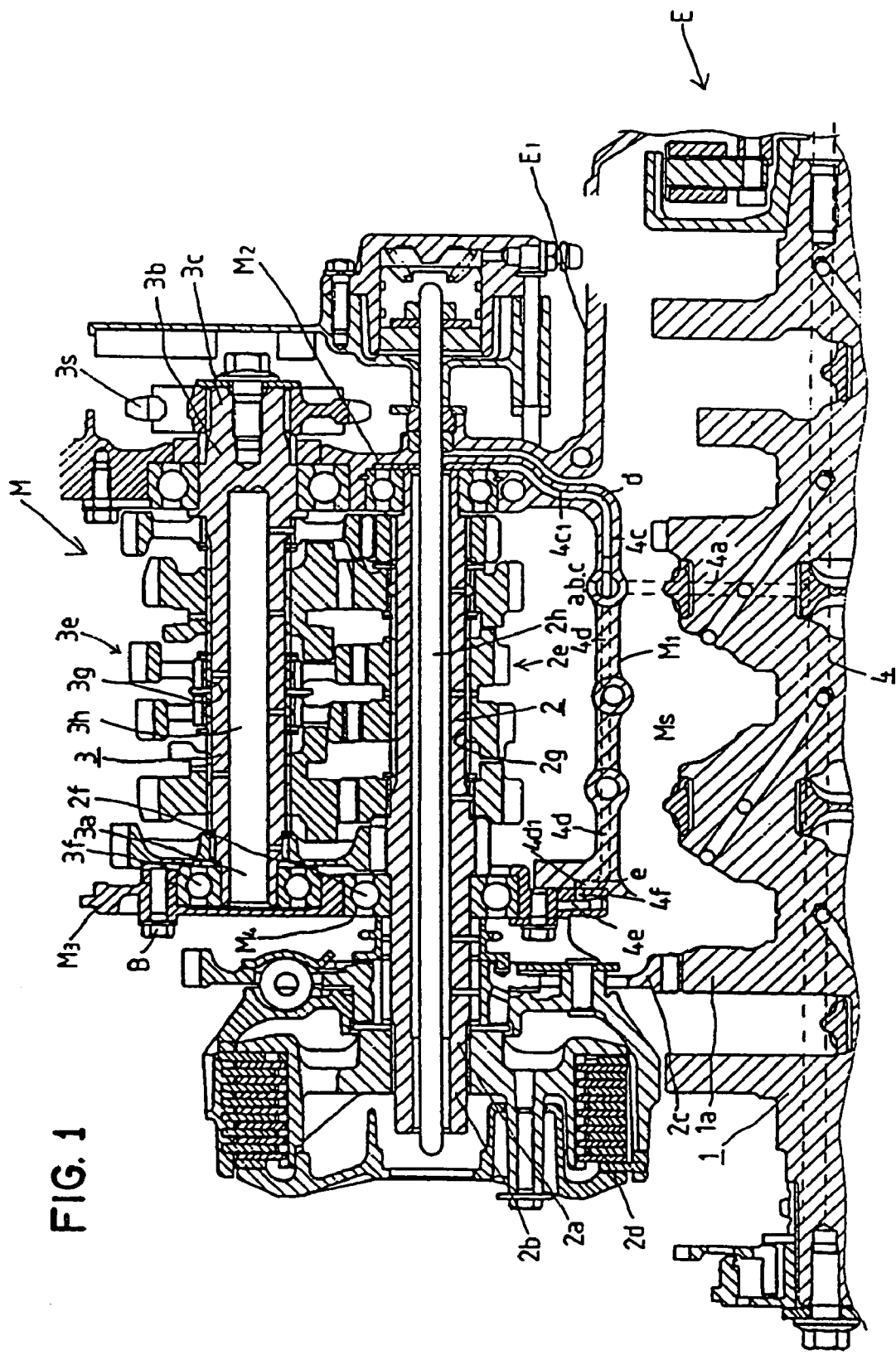
FIG. 1 is a cross sectional drawing in a direction along a crankshaft, showing main structural components of the present invention.

FIG. 1 is a cross sectional view showing the main structural components of the present invention.

FIG. 1 shows a crank shaft 1 and part of a crank case E1, which are structural components of an engine E, and also shows a transmission gear mechanism M.

A primary drive gear 1a is attached to one end of the crankshaft 1 of the engine E, this primary drive gear 1a meshes with a primary driven gear 2c on the main shaft 2, and a switching clutch 2d is interposed between the primary driven gear 2c and the main shaft 2.

A reduction gear train 2e of the transmission gear mechanism M is axially mounted on the main shaft 2, meshes with a reduction gear train 3e of the counter shaft 3 (drive shaft) and drives the counter shaft 3 at a selected gear ratio. A drive sprocket 3s is fixed to a right end 3b of the counter shaft 3, and drive force is transmitted to a drive wheel for driving the vehicle via a chain (not shown).

The crankshaft 1 is rotatably held in a crankcase E1 via bearings, that will be described later, and the main shaft 2 and counter shaft 3 are rotatably held in a transmission case M1 connected to the crankcase E1 via bearings 2f and 3f. The transmission case M1 has one side blocked off by a side wall section M2 integrally formed with the transmission case body, while the other end has an open structure, with a separately formed cartridge type transmission holder M3 being fastened to the open structure, thus forming a transmission chamber M5.

The main shaft 2 has a left end, namely one axial end 2a, passing through an open section M4 of a transmission holder M3 to project from the transmission holder M3 that is fastened to an open structure section on another end of the transmission case M1, with the primary driven gear 2c and the switching clutch 2d being attached to this projecting section 2b.

Also, the counter shaft 3 has a left end, that is one axial end 3a, covered by the transmission holder M3, and a right end, namely the other axial end 3b, projecting from a side wall of the transmission case M1, and a drive sprocket 3s, for driving the drive wheel for driving the vehicle via the chain described above, is fixed to this projecting section 3c.

An overview of the engine E and the transmission gear mechanism M of this embodiment had been given above, and these structures are well known.

A lubricating structure for the engine E and the transmission gear mechanism M of this embodiment will be described in the following with reference to the drawings. FIG. 3 is a drawing of a lower crankcase E1 looking from the direction V—V of FIG. 2, with an arrow F indicating the front of the vehicle, and small arrows in the drawing representing flow of lubricating oil.

Reference numeral 42 represents an oil filter, and this oil filter 42 is attached to a right side of a lower crank case E1, with an oil cooler 43 being attached to a front surface of the lower crank case E1 of a center front cylinder of four cylinders, and a main gallery 4 is provided so that a lower part of the crankshaft 1 of the lower crankcase E1 passes through laterally.

Above the main gallery 4, an oil supply passage (a) intersecting the main gallery 4 and connecting to an oil inlet 42a of an oil filter 42 can be seen. Also, the cross section of a supply passage (b) branching downwards from a bent section of the supply passage (a) can be seen. An oil outlet 42b of the oil filter 42 and an oil inlet 43a of an oil cooler 43 are connected by a supply passage (c). An oil outlet 43b of the oil cooler 43 and an oil inlet 4o of the main gallery 4 are connected by an supply passage (d).

Also, bearing sections 11 of a crankshaft 1 formed at five places on an upper surface of a lower crank case E1 are shown in FIG. 3, with oil supply passages (e) communicating with the main gallery 4 being formed in the center of each bearing section 11. Slits 11a are formed at both sides of the oil supply passages (e). Reference numeral 11b is a bolt hole for connecting and making upper and lower bearing sections 11 of the crank case E1 into a toroid shape.

Lubricating oil that has been pressure fed by an oil pump 41 (refer to FIG. 4) that will be described later through the oil supply passage (a) and into the oil filter 42 is purified by the filter, and then passes through the supply passage (c) and enters the oil cooler 43. After cooling using water, the oil passes through the supply passage (d) and into the main gallery 4, and is also supplied through the supply passages (e) branching from the main gallery 4 to each bearing section 11 of the crankshaft 1 and is used in lubrication of the bearing section 11.

Also, lubricating oil is supplied through the oil supply passage 4a to the main shaft 2 and counter shaft 3 of the transmission gear mechanism, which will be described later (refer to FIG. 1, FIG. 2 and FIG. 7), and is used in the lubrication of these shafts. Water that has been raised in temperature by the process of cooling the lubricating oil is then cooled by a radiator, not shown, fitted to the front of the vehicle. With this internal combustion engine, the oil cooler itself is also fitted to the front of the internal combustion engine, which is effective for air-cooling of the oil.

Figure 4:
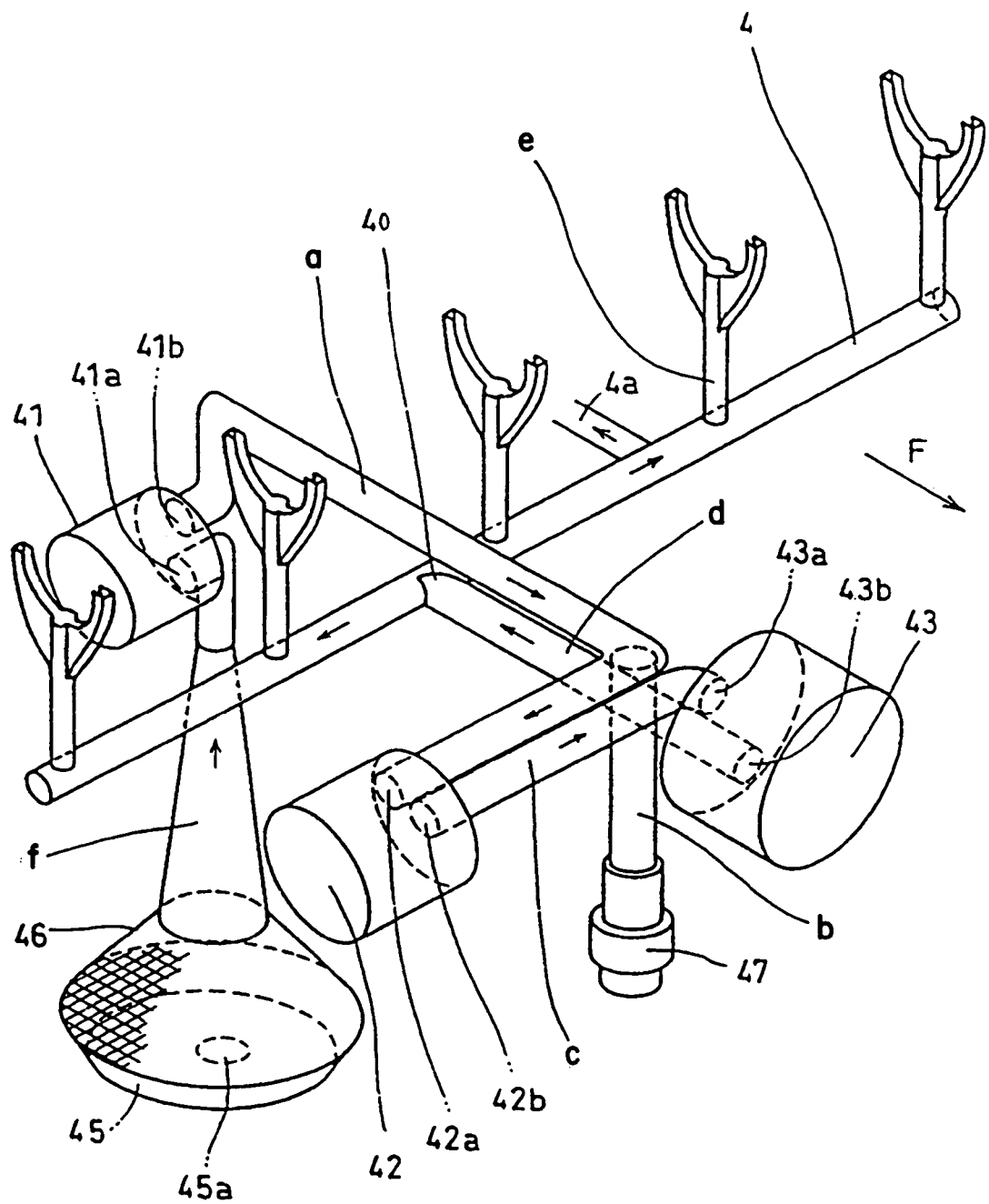
FIG. 4 is a perspective view of the lubricating oil supply system of the present invention.

FIG. 4 is a perspective drawing showing connection of oil supply passages of this embodiment in an easy to understand manner. Arrow F represents the forward direction of the vehicle. The small arrows in the drawing represent flow of lubricating oil. The names of each of the members and units in this drawing are as already described. In the lubricating oil supply system shown in the drawing, lubricating oil taken in from an oil inlet 45a of a strainer 45 passes through a passage (f) inside an oil intake pipe 46, and enters the oil pump 41 from the oil inlet 41a

Lubricating oil that has been raised in pressure by the oil pump 41 is output from an oil outlet 41b, passes through the supply passage (a) and enters into the oil filter 42 from the oil inlet 42a, and lubricating oil that has been purified by the inside of the oil filter 42 is output from an oil outlet 42b, passes through the supply passage (c) and enters into the oil cooler 43 from an oil inlet 43a. Cooled lubricating oil then comes out from an oil outlet 43b, passes through the supply passage (d) and enters the main gallery 4 from the oil inlet 4o.

Figure 2:
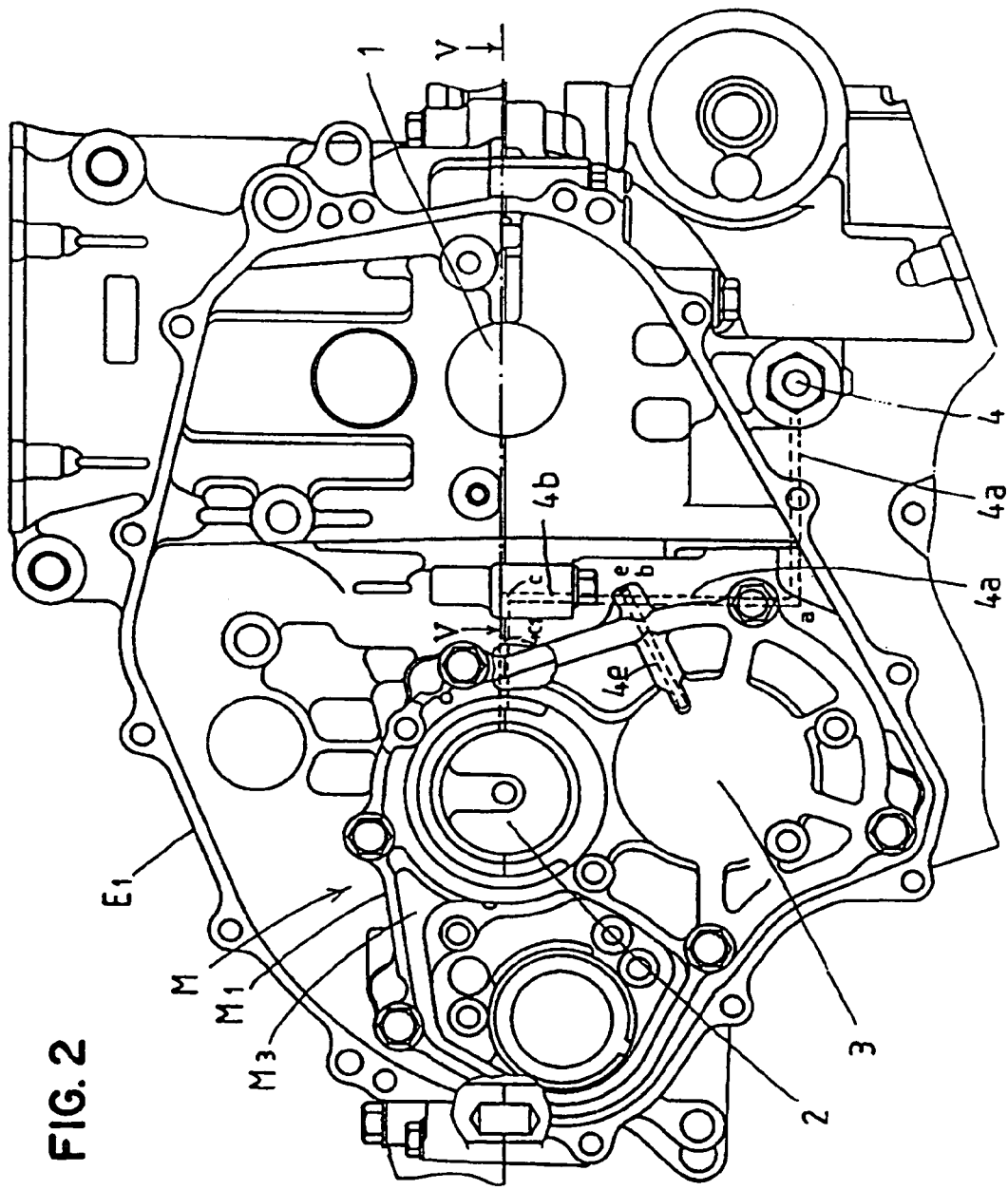
FIG. 2 is a side elevation in a direction orthogonal to a crankshaft, showing main structural components of the present invention.
Figure 3:
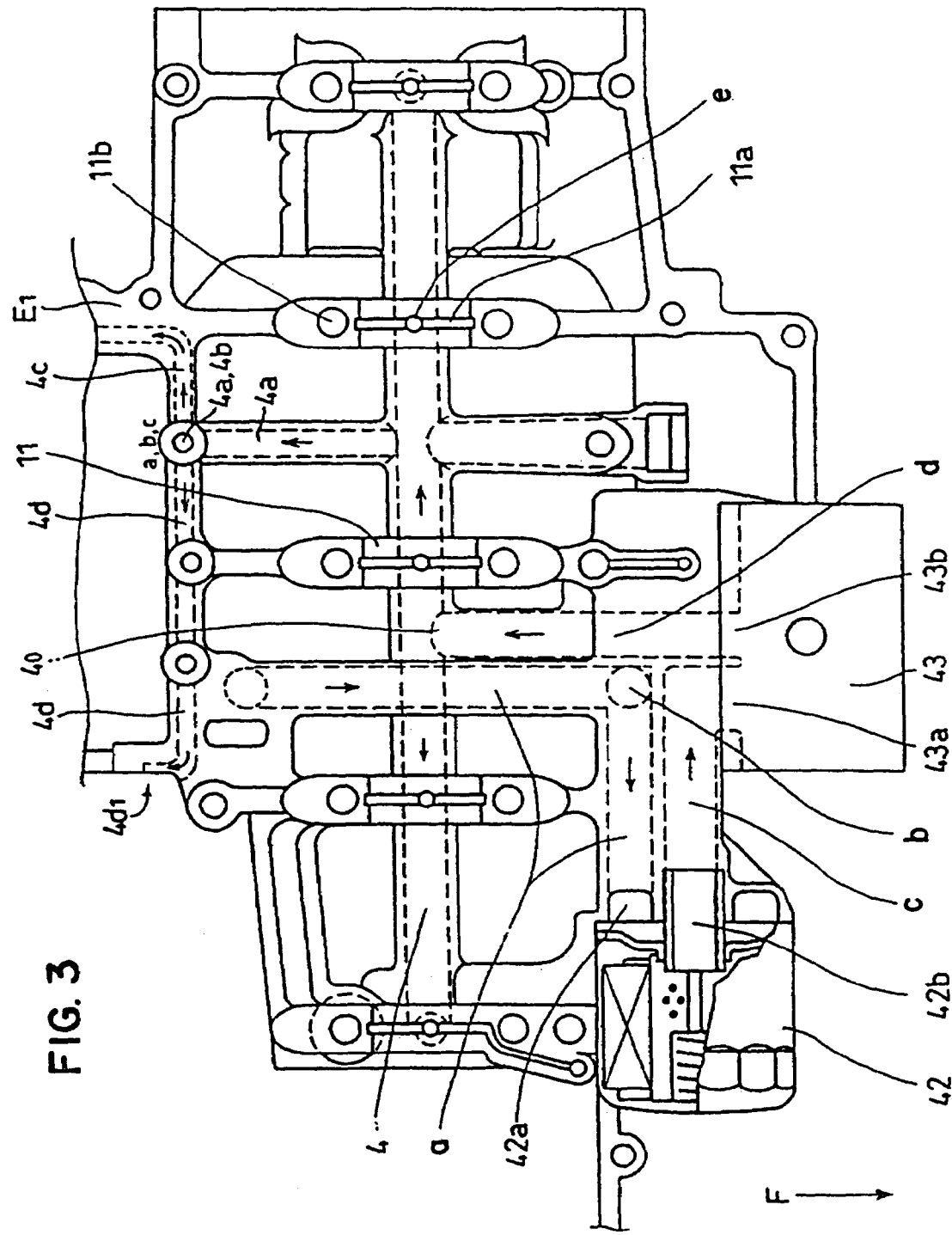
FIG. 3 is a drawing showing main parts of a lubricating oil supply system of the present invention, and is a drawing looking at a lower crank case from the direction V—V in FIG. 2.
Figure 7:
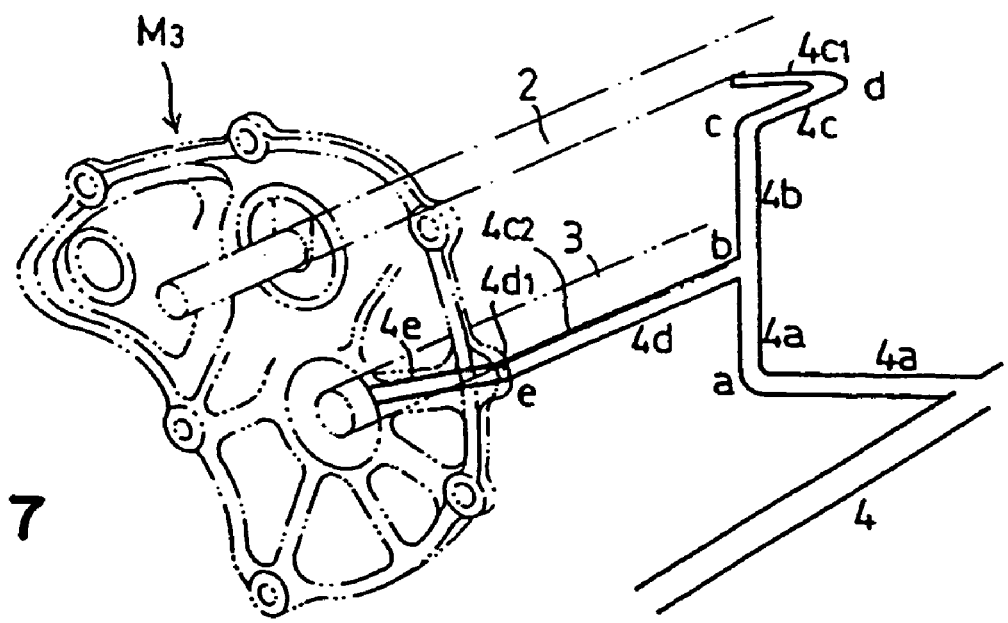
FIG. 7 is an explanatory diagram of the lubricating oil supply passage of the present invention.
Figure 8:
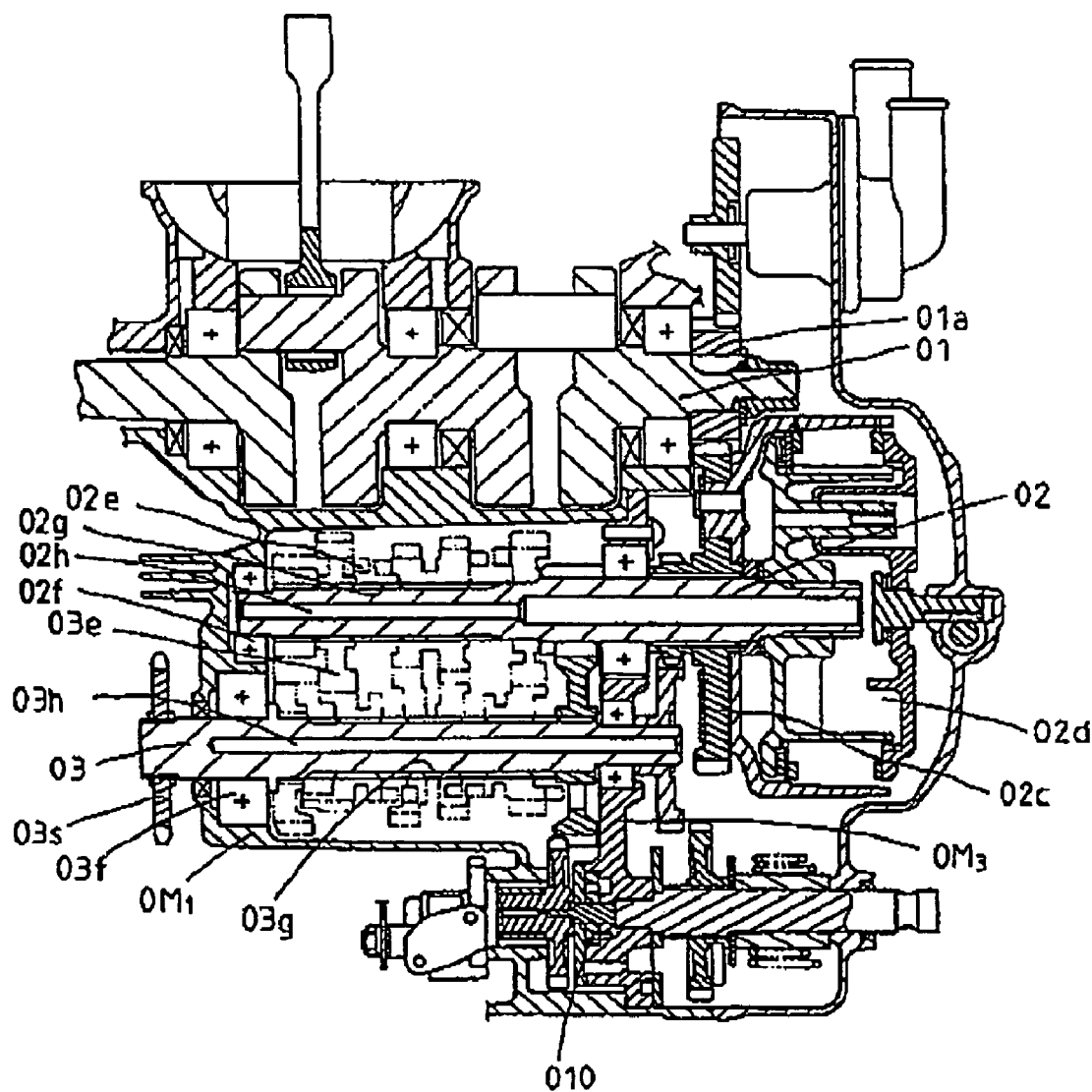
FIG. 8 is a drawing showing main structural elements of an invention of the related art, and corresponds to FIG. 1 of the present invention.
Figure 9:
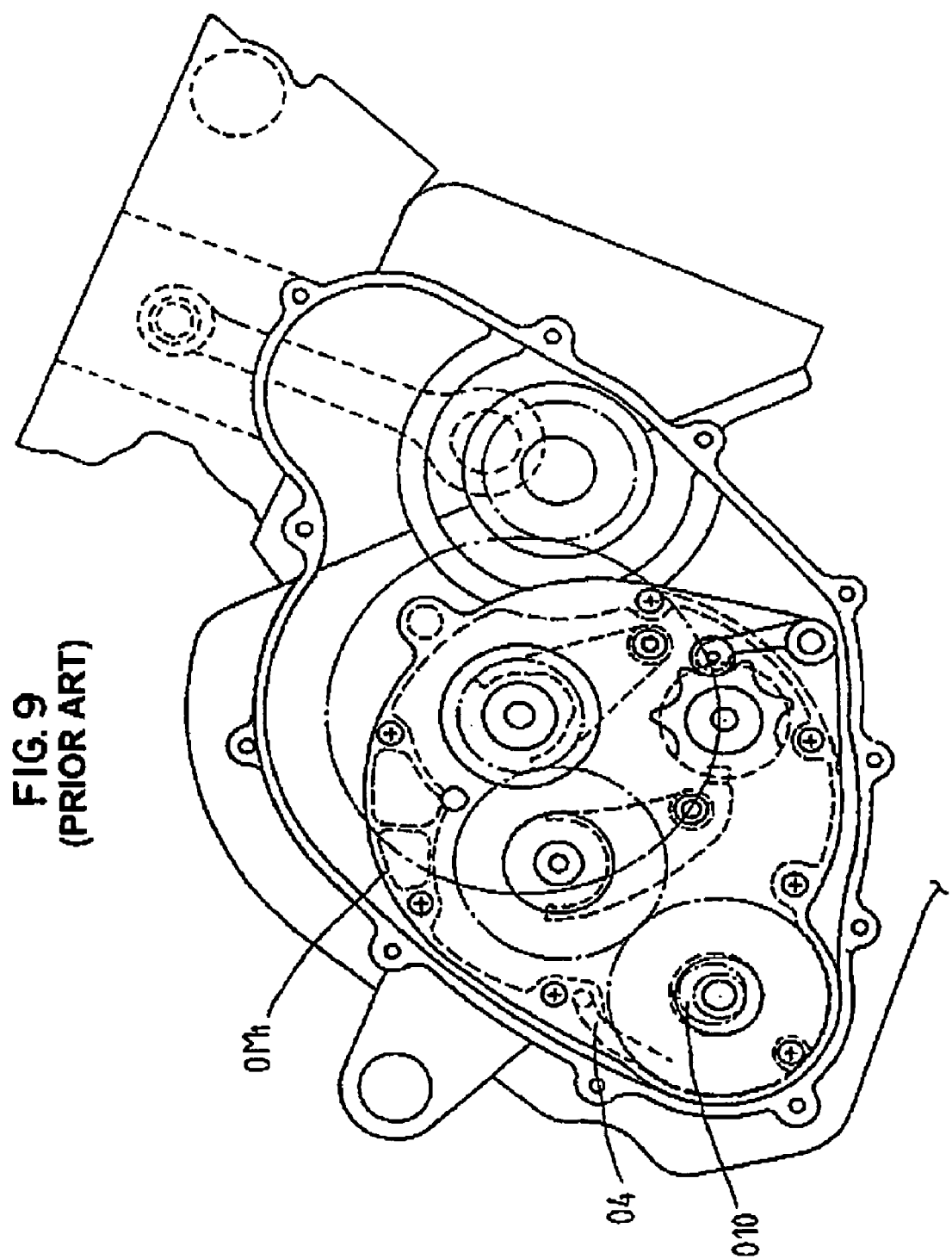
FIG. 9 is a drawing showing main structural elements of an invention of the related art, and corresponds to FIG. 2 of the present invention.

Lubricating oil that has been injected to a substantially central part of the rectangular main gallery 4 is spread substantially uniformly to the five supply passages (e), passes through the passages (e) and a slit 11a (refer to FIG. 3) and is supplied to each of the bearing sections 11 of the crankshaft 1, and is also supplied through the supply passage 4a to the main shaft 2 and counter shaft 3 of the transmission gear mechanism (refer to FIG. 1, FIG. 2 and FIG. 7).

When overpressure is caused in the lubricating oil by the oil pump 41, the overpressure is released by a relief valve 47 connected to a lower end of a passage branching from the supply passage (a). Released lubricating oil is returned to a oil pan (not shown). The above described passages (a) and (b) are passages formed inside the crankcase E1.

Figure 5:
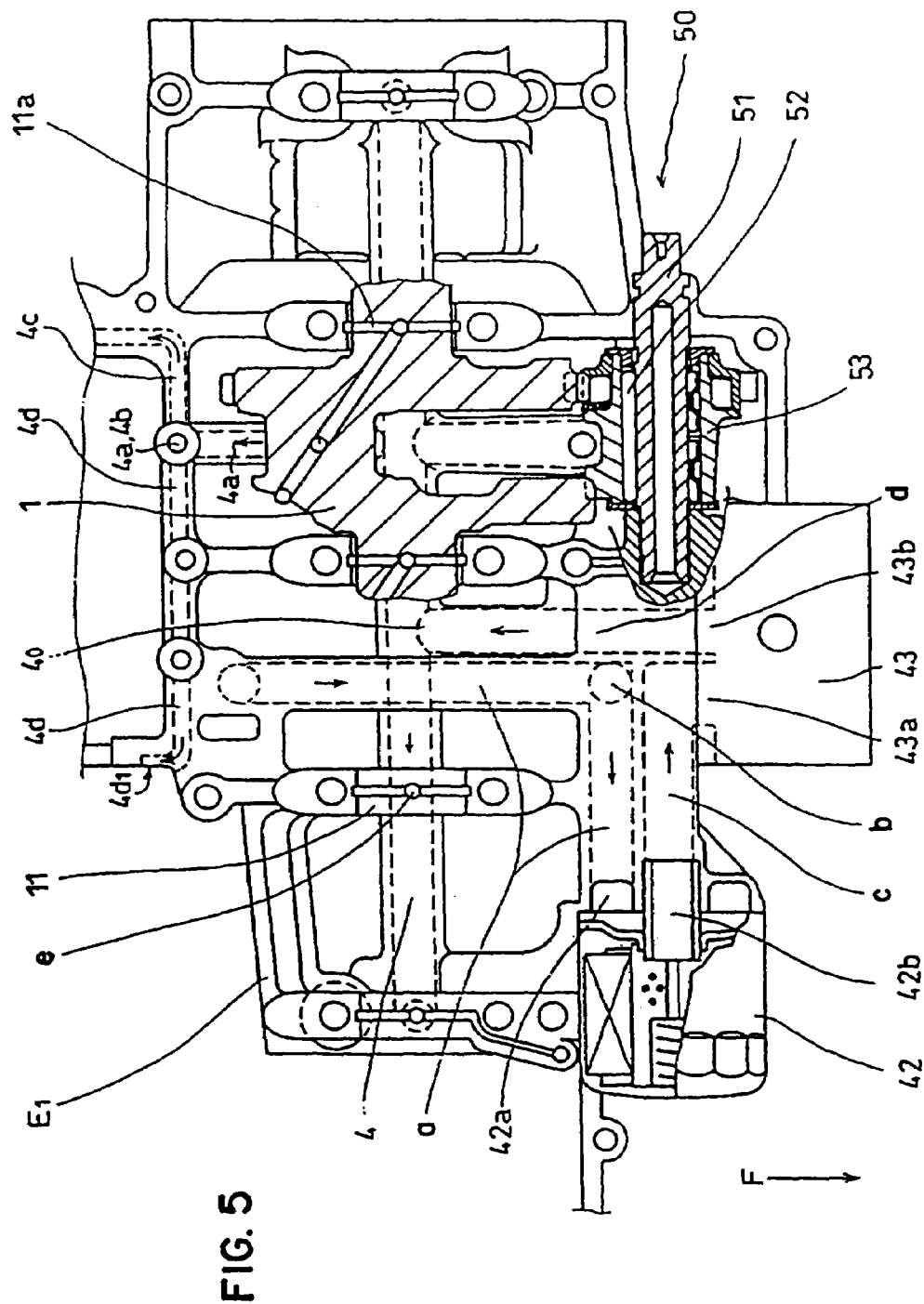
FIG. 5 is a drawing showing part of a crankshaft seen from the direction V—V in FIG. 2 and a drawing of a balancer overlapping at a position corresponding to the lower crank case of FIG. 3.

FIG. 5 is a drawing showing a drawing of a balancer 50, which is part of the crankshaft 1, overlapping a position corresponding to the lower crankcase E1 of FIG. 3 viewed from the direction of arrow V—V in FIG. 2, and in FIG. 5, the cross section of both the crankshaft 1 or the balancer 50 are shown, but it is possible to easily grasp the relationship between the crankshaft 1 and each of the oil supply passages with reference to this drawing.

In FIG. 5, numeral 51 is a balancer shaft, and this shaft is fixed and supported to a wall section of the lower crankcase E1. Also, numeral 52 is a needle bearing provided at the outer periphery of the balancer shaft 51, and a balancer weight 53 is rotatably held on the balancer shaft 51 via this bearing 52.

Lubricating oil fed from the oil pump 41, through the supply passage (a), oil filter 42, passage (c), oil cooler 43 and passage (d) to the main gallery 4 is used for lubrication of each of the bearing sections 11 of the crankshaft 1, as already described, and at the same time is supplied through the supply passage 4a to the main shaft 2 and counter shaft 3 of the transmission gear mechanism.

As shown in FIG. 1 and FIG. 2, lubricating oil supplied to the counter shaft 3 and the main shaft 2 passes through oil passages 2h and 3h that penetrate respective inner parts of the main shaft 2 and counter shaft 3, and is supplied to mounting sections 2g and 3g for reduction gear trains 2e and 3e mounted on the shafts 2 and 3, and to respective bearing sections 2f and 3f rotatably supporting the shafts 2 and 3.

Figure 6:
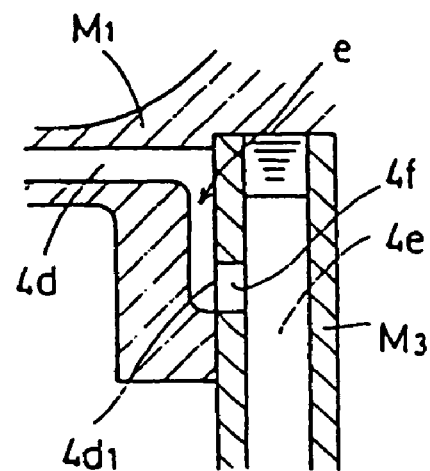
FIG. 6 is an enlarged view showing the main structural components of the present invention.

Supply of oil to the main shaft 2 and counter shaft 3 using the lubricating oil supply passages is carried out by means of the suitably fixed branch passages from the main gallery 4, as described above, but here, a specific description of the structure of the oil supply passages to the main shaft 2 and counter shaft 3 will be given based on FIG. 1 and FIG. 2, and with reference to FIG. 6 and FIG. 7 showing details of the supply passages.

As has already been described, the main gallery 4, being the main lubricating oil supply passage, is formed passing through the inside of the lower structure of the crankcase E1 below the engine crankshaft 1, and the main gallery 4 is stretched out in a substantially axial direction of the crankshaft 1.

The oil supply passage 4a, that is separate to the oil supply passage (e) to the crankshaft bearing section 11 passing through the inside of the lower structure of the engine crank case E1 in a direction orthogonal to the main gallery 4, extends to the main gallery 4, and this supply passage 4a extends a specified length in a direction substantially orthogonal to the main gallery 4 in a substantially flat state, and curves vertically at a point shown by (a), being a connecting structure section of the transmission case M1 connected to the crank case E1 (Refer to FIG. 2 and FIG. 7).

The oil supply passage 4a that is curved vertically at point (a) is formed into passages branching in two different direction at point (b), that is, it branches into a passage 4b and a passage 4d, these two passages being formed to supply lubrication oil to the main shaft 2 and to the counter shaft 3 (refer to FIG. 7).

One of the branching passages 4b is a branched passage for supply of lubricating oil to the main shaft 2, and the passage 4b extends upwards from the oil supply passage 4a at branch point (b) and extends through the inside of a wall section of a connecting section of the crank case E1 and the transmission case M1, and the length (height) of this passages reaches a point represented by a position (c) adjacent to the main shaft 2.

At the point (c), the oil supply passage 4b then forms a passage 4c extending a fixed length through the inside of the wall section, in an axial direction of the main shaft 2, and then at the point represented by (d) curves along the wall section of the transmission case M1 at the inside of the transmission case M1 wall towards the main shaft 2, and after that has a passage section 4c1 connecting to an oil supply passage 2h passing through an inner part of the main shaft 2 (refer to FIG. 1, FIG. 2 and FIG. 7).

Also, at the branch point (b), another oil supply passage 4d branching in a bent fashion at substantially a right angle from the oil supply passage 4a is a lubricating oil supply passage to the counter shaft 3, and this passage 4d extends substantially horizontally a specified length through the inside of a wall section close to the connecting section of the crank case E1 and the transmission case M1, and reaches a position (e) adjacent to the counter shaft 3.

The oil supply passage 4*d* reaches a position (e), and then connects to an oil supply passage 3*h* passing through the inside of the counter shaft 3, via an inner connecting section 4*e* of the transmission holder M3 that is a fixed length extending from point (e) so as to incline downwards (refer to FIG. 1, FIG. 2 and FIG. 7).

As can be understood from reference to FIG. 6, the structure of the oil supply passage 4*d* at point (e) is a characteristic feature. Specifically, the oil supply passage 4*d* inside the transmission case M1 wall section is in a remaining open state at the end wall section of the transmission case M1, forming the passage opening 4*d*1, and the passage opening 4*d*1 of the passage 4*d* is blocked off by the holder M3 at the same time as attaching the transmission holder M3 to the transmission case M1.

More specifically, inside the transmission holder M3, an oil supply passage 4*e* is formed with one end blocked off and the other end reaching the counter shaft 3, and in a state where a passage opening 4*f* at a side section close to this passage 4*e* is connected to an opening 4*d*1 of the passage 4*d* of the end wall section of the transmission case M1, the transmission holder M3 is brought into contact with the transmission case M1 end wall section, and the opening 4*d*1 of the passage 4*d* in an opened state is blocked off by attaching and fixing with bolts B. (refer to FIG. 1).

The passage opening 4*d*1 of the passage 4*d* in the open state is then blocked off by attachment to the transmission case M1 of the cartridge type transmission holder M3 to form a supply passage for lubrication oil from the main gallery 4 to the counter shaft 3.

A supply passage for lubrication oil to the main shaft 2 and counter shaft 3 of the transmission gear mechanism M has the above described structure, but with respect to the outline of this supply passage, it can be grasped easily, based on FIG. 7, that lubrication oil supplied from the main gallery 4 to the main shaft 2 and counter shaft 3 passes through two branched passages 4*b* and 4*d*, and also, it can be easily understood that using the transmission holder M3 a partial passage opening 4*d*1 of the branched passage 4*d* to the counter shaft 3 is configured to be blocked off.

The embodiments shown in FIG. 1 to FIG. 7 have the above described structure, which means that the blocking up of the passage opening in an opened state, of the lubricating oil supply passages, is achieved at the same time as attaching the transmission holder M3 using bolts, and so it is possible to omit a separate operation of assembling plug members for blocking the opening.

As a result, operating efficiency at the time of transmission gear mechanism assembly is improved, there are no problems accompanying forgetting assembly of plug members etc., and there is no need for separate components such as plug members, making it possible to reduce cost to that extent.

Other embodiments of the present invention can also be considered instead of the previously described embodiments.

Instead of the transmission gear mechanism of the above described embodiments of the invention, it is possible to adopt a cartridge type transmission integrally unitized with a transmission holder, and in this way it is possible to simply remove the unitized transmission gear mechanism without dismantling the crank case.

Also, since the lubricating oil supply passages described above are formed using the transmission holder at the same time as assembling the unitized transmission gear mechanism, it is possible to omit a troublesome operation of blocking off passage openings, it is possible to improve operability and to reduce cost, and as an essential result of using the unitized cartridge type transmission it is possible to omit time required to exchange gears, particularly with a racing car.

While the invention has been described in particular embodiments, it is to be understood that the words which have been used are words of description rather than limitation and that changes within the purview of the appended claims may be made without departing from the true scope and spirit of the invention in its broader aspects.

We claim:

1. A lubrication system supplying oil to a main shaft and a counter shaft of a transmission gear mechanism where the main shaft and the counter shaft are disposed in a transmission case connected to a crank case of an engine, comprising an oil supply passage formed in a wall section of the transmission case for supplying oil for lubrication from a main gallery of the engine to the main shaft and the counter shaft, the oil supply passage having a passage opening at a clutch side of the transmission case, and a transmission holder of the transmission gear mechanism secured to the transmission case at the clutch side and blocking off the passage opening, an end of the main shaft extends through the transmission holder to project from the transmission case, an end of the counter shaft is covered by and rotatably supported on the transmission holder, the transmission case has one side blocked off by a side wall section integrally formed with the transmission case and one side that is open, and the transmission holder is fastened to the transmission case and closes off the open side of the transmission case.

2. The lubrication system of claim 1, wherein the transmission gear mechanism is a cartridge type transmission integrally unitized with the transmission holder whereby it is possible to remove the transmission gear mechanism without dismantling the transmission case.

3. The lubrication system of claim 2, wherein a clutch is attached on the cartridge type transmission.

4. The lubrication system of claim 1, wherein the transmission holder includes an oil supply passage with a passage opening, and the passage opening of the oil supply passage in the wall section is connected to the passage opening of the oil supply passage of the transmission holder when the transmission holder is secured to the transmission case.

5. A lubrication system supplying oil to a main shaft and a counter shaft of a transmission gear mechanism where the main shaft and the counter shaft are disposed in a transmission case connected to a crank case of an engine, comprising an oil supply passage formed in a wall section of the transmission case for supplying oil for lubrication from a main gallery of the engine to the main shaft and the counter shaft, the oil supply passage having a passage opening, and a transmission holder of the transmission gear mechanism secured to the transmission case at a clutch side and blocking off the passage opening; the transmission holder includes an oil supply passage with a passage opening, and the passage opening of the oil supply passage in the wall section is connected to the passage opening of the oil supply passage of the transmission holder when the transmission holder is secured to the transmission case, and the oil supply passage of the transmission holder is formed integrally with the transmission holder, an end of the main shaft extends through the transmission holder to project from the transmission case, and an end of the counter shaft is covered by and rotatably supported on the transmission holder.

* * * * *